United States Patent [19]

Niemczyk et al.

[11] Patent Number: 5,282,386
[45] Date of Patent: Feb. 1, 1994

[54] APPARATUS AND TECHNIQUE FOR FLUID LEVEL DETERMINATION IN AUTOMATIC TRANSMISSIONS

[75] Inventors: Robert T. Niemczyk; Thomas H. Wilson, both of Indianapolis; Phillip F. McCauley, Zionsville; Ronald A. Lee, Brownsburg; William M. Murray, Pittsboro, all of Ind.

[73] Assignee: General Motors Corporation, Detroit, Mich.

[21] Appl. No.: 949,165

[22] Filed: Sep. 22, 1992

[51] Int. Cl.[5] .................... B60K 41/04; G01F 23/30
[52] U.S. Cl. ........................ 73/292; 340/459; 374/142
[58] Field of Search ............ 73/292; 374/142; 340/450, 450.3, 449, 459

[56] References Cited

U.S. PATENT DOCUMENTS

| | | | |
|---|---|---|---|
| 3,431,779 | 3/1969 | Wilken et al. | 73/291 |
| 4,344,136 | 8/1982 | Panik | 340/459 |
| 4,403,296 | 9/1983 | Prosky | 374/166 |
| 4,409,832 | 10/1983 | Konjedic et al. | 340/459 X |
| 4,815,323 | 3/1989 | Ellinger et al. | 73/292 X |
| 4,859,987 | 8/1989 | Markus | 340/450 |
| 4,873,451 | 10/1989 | Pristera et al. | 340/459 X |
| 4,890,491 | 1/1990 | Vetter et al. | 73/291 X |

Primary Examiner—Daniel M. Yasich
Attorney, Agent, or Firm—Donald F. Scherer

[57] ABSTRACT

An apparatus and technique for fluid level determination in automatic transmissions. The invention employs an electronic control unit in association with an automatic transmission for a vehicle, the electronic control unit receiving data corresponding to transmission oil level, transmission oil temperature, engine speed, transmission speed, and transmission selected range. Upon determining that such data satisfies certain diagnostic tests, the level of transmission fluid within the transmission is determined and adjusted or otherwise normalized to ideal test conditions. The electronic control unit compensates an oil level signal for deviations in oil temperature from an optimum test temperature, and makes further compensation for deviations in engine speed and settling time at the time that the test data is acquired. Additionally, variations in oil density as a function of oil temperature are also compensated.

3 Claims, 2 Drawing Sheets

APPARATUS AND TECHNIQUE FOR FLUID LEVEL DETERMINATION IN AUTOMATIC TRANSMISSIONS

TECHNICAL FIELD

The invention herein resides in the art of power transmission systems and, more particularly, to automatic transmissions for vehicles. Specifically, the invention relates to an apparatus and technique for accurately and reliably determining the transmission oil level in automatic transmissions for vehicles.

BACKGROUND ART

Automatic transmissions for vehicles are in common use, for they are particularly conducive to vehicle efficiency and operator comfort. However, the operational efficiency of an automatic transmission is, in large part, dependent upon the presence of a proper volume of transmission fluid or oil within the transmission itself. Not only is the proper operation of the transmission dependent upon the presence of an appropriate volume of transmission oil, but the same also assures that transmission wear is minimized, prolonging the useful life of the system.

Presently, the fluid level within an automatic transmission is typically monitored through the use of a dipstick. However, for correct fluid level measurement, the dipstick must be properly calibrated for each installation, and the measurements must be taken under optimum or ideal operating conditions. Included among these conditions are an assurance that the transmission oil is at a normal operating temperature, the engine speed or input speed to the transmission is at a set level, and oil drain back or settling time requirements for the transmission have been satisfied. Of course, operator capabilities also impact the accuracy of the reading taken with the dipstick, since any such measurement requires that the operator correctly observe and interpret the difference between the oil line and the full/add lines upon the dipstick. Quite frequently, the requirements for ideal operating conditions and operator capability are not met when the measurement is taken and acted upon. The resultant incorrect automatic transmission fluid level results in poor shift quality, inefficient operation, operator discomfort, and reduced transmission life.

There is a need in the art for an apparatus and technique for fluid level determination in automatic transmissions which automatically accounts and adjusts for less-than-ideal checking conditions, and removes subjective interpretation of measurements in determining the proper deviation of the fluid level in automatic transmissions from a standard acceptable level.

DISCLOSURE OF INVENTION

In light of the foregoing, it is a first aspect of the invention to provide an apparatus and technique for fluid level determination in automatic transmissions which accounts and adjusts for non-ideal operating conditions at the time of measurement.

Another aspect of the invention is the provision of an apparatus and technique for fluid level determination in automatic transmissions which is substantially automatic and not given to operator error.

A further aspect of the invention is the provision of an apparatus and technique for fluid level determination in automatic transmissions which accommodates variations in oil temperature and resultant density, engine speed, and settling time.

Further aspects of the invention are attained by an apparatus and technique for fluid level determination in automatic transmissions which allows for highly accurate and repeatable measurements.

Yet additional aspects of the invention are attained by an apparatus and technique for fluid level determination in automatic transmissions which are easily implemented with presently existing electronic control units for transmissions.

The foregoing and other aspects of the invention which will become apparent as the detailed description proceeds are achieved by a method for determining an oil level in a transmission driven by an engine, comprising: generating a first signal corresponding to an actual transmission oil level and density; generating a second signal corresponding to actual transmission oil temperature; determining said actual oil level as a function of said first and second signals; determining a deviation of actual engine speed from a reference idle engine speed and compensating said determination of actual oil level as a function thereof; calculating a deviation of said compensated actual oil level from a desired oil level and determining a volume error therefrom; determining a deviation of said actual oil temperature from a typical operating reference temperature of said transmission oil; and adjusting said volume error as a function of said deviation of said oil temperature.

Other aspects of the invention which will become apparent herein are attained by a method for determining an oil level in a transmission driven by an engine, comprising: placing said transmission in neutral; determining an actual oil level within the transmission; determining a deviation of actual engine speed from a reference idle engine speed and compensating said determination of said actual oil level as a function thereof; determining a period of time from when said transmission was placed in neutral and said determination of actual oil level was made and compensating said determination of actual oil level as a function thereof; calculating a deviation of said compensated oil level determination from a desired oil level and determining a volume error therefrom; determining a deviation of actual oil temperature from a typical operating reference temperature of the transmission oil; and adjusting said volume error as a function of said deviation of said oil temperature.

Yet additional aspects of the invention which will become apparent herein are attained by apparatus for determining an oil level in a transmission driven by an engine, comprising: means within the transmission for generating a first signal corresponding to an actual transmission oil level and density; means within the transmission for generating a second signal corresponding to actual transmission oil temperature; and means connected to said transmission for receiving said first and second signals and determining said actual oil level as a function thereof, determining a deviation of actual engine speed from a reference idle engine speed, determining a period of time between when the transmission is placed in neutral and said determination of actual oil level is made, compensating said determination of actual oil level as a function of said deviation of engine speed and said period of time, calculating a deviation of said compensated oil level from a desired oil level and determining a volume error therefrom, determining a deviation of actual oil temperature from a typical operating reference temperature of the transmission oil, and adjusting said volume error as a function of said deviation of oil temperature.

DESCRIPTION OF DRAWINGS

For a complete understanding of the apparatus and techniques of the invention, reference should be made to the following detailed description and accompanying drawings wherein.

BEST MODE FOR CARRYING OUT THE INVENTION

Figure 1:
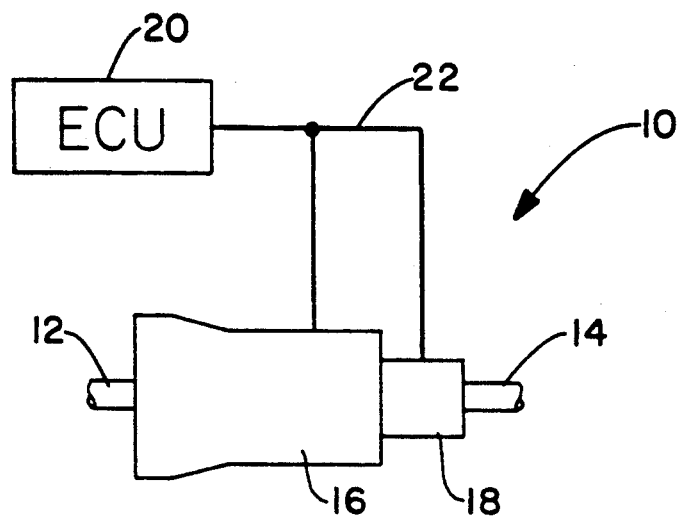
FIG. 1 is block diagram of an automatic transmission adapted for employing the concept of the invention.

Referring now to the drawings and more particularly FIG. 1, it can be seen that an automatic transmission for a vehicle which is adapted for employing the concept of the invention is designated generally by the numeral 10. The transmission system 10 includes a power input shaft 12 appropriately connected to an engine or other appropriate power source (not shown), and an output shaft 14 appropriately connected to a driven member such as a wheel axle or the like (not shown). Interposed between the input and output shafts 12, 14 is an automatic transmission 16 which, as is well known to those skilled in the art, includes a plurality of hydraulically controlled gear stages. If desired, the transmission 16 may include a hydrodynamic retarder 18 interconnected with the power output shaft 14 for purposes of braking the vehicle by braking the output torque of the output shaft 14 by increasing the load thereon.

An electronic control unit 20 is, in standard fashion, interconnected with the transmission 16 and retarder 18 through a data and control bus 22. Those skilled in the art will readily appreciate that the electronic control unit 20 comprises one or more dedicated microprocessors or other control units. The electronic control unit 20 controls the operation of the transmission 16 and retarder 18 in standard fashion, and is adapted for two way communication therewith, obtaining operational data and providing resultant controlling commands.

Figure 2:
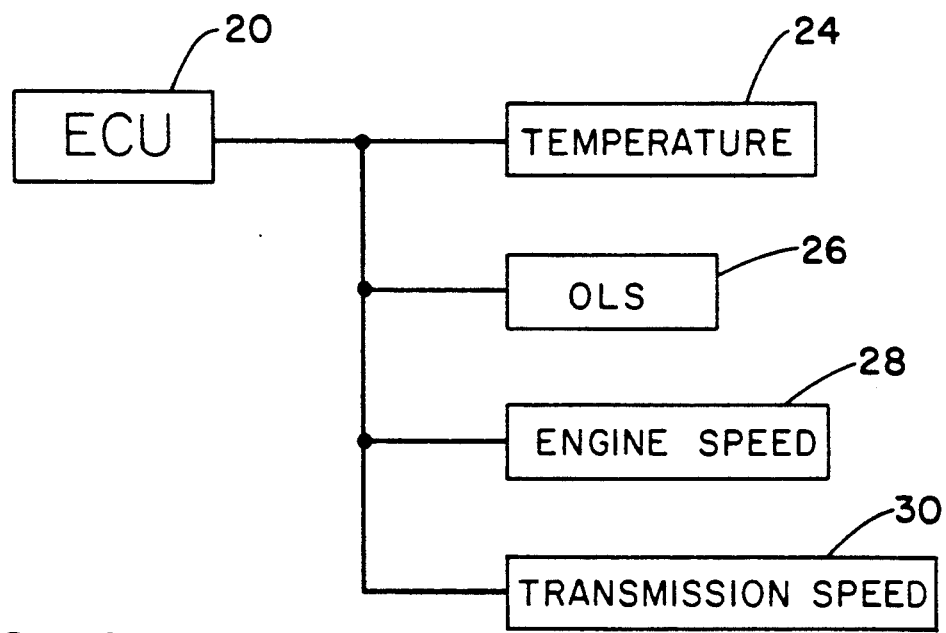
FIG. 2 is a block diagram illustration of a transmission electronic control unit in communication with various transmission sensors in the structure of FIG. 1.

As shown in FIG. 2, according to the invention the electronic control unit 20 communicates through the data and control bus 22 with a plurality of sensors and transducers to obtain operational information for assistance in determining the transmission fluid level according to the invention. As a portion of the invention, an appropriate thermistor or other temperature sensor 24 is maintained within the reservoir of the transmission 16 to produce an output signal corresponding to the instantaneous temperature of the transmission oil. Similarly received within the reservoir cavity of the transmission 16 is an oil level sensor 26 which, as is known to those skilled in the art, presents an output signal which is a function of the actual level of oil within the reservoir and the density of the oil. In a preferred embodiment of the invention, the oil level sensor 26 comprises a Hall effect sensor operating upon a float. Of course, other sensors may be employed in keeping with the concept of the invention. Since the density of the transmission oil changes with temperature, and since the float level of the sensor 26 is not only a function of actual fluid level, but also of the density of the fluid, the output of the oil level sensor 26 is a function of actual oil level and the oil density as impacted by the oil temperature.

An engine speed transducer 28 is also interconnected with the electronic control unit 20 and produces an output signal corresponding to the instantaneous speed of the engine connected to the input shaft 14. Of course, the engine speed transducer 28 may typically be provided in operative interconnection with the input shaft 12. A transmission speed transducer 30 is also interconnected between the electronic control unit 20 and the output shaft 14 to provide a signal corresponding to the instantaneous transmission output speed as evidenced at the shaft 14.

With the electronic control unit 20 preferably comprising one or more dedicated microprocessors, it is most desired that the input signals thereto be digital signals, rather than analogue. Accordingly, the sensors and transducers 24–30 may either be selected to provide digital output signals, or a suitable analogue to digital converter may be interposed between each of the sensors and transducers 24–30 and the electronic control unit 20 to assure that digital information is provided thereto.

Figure 3:
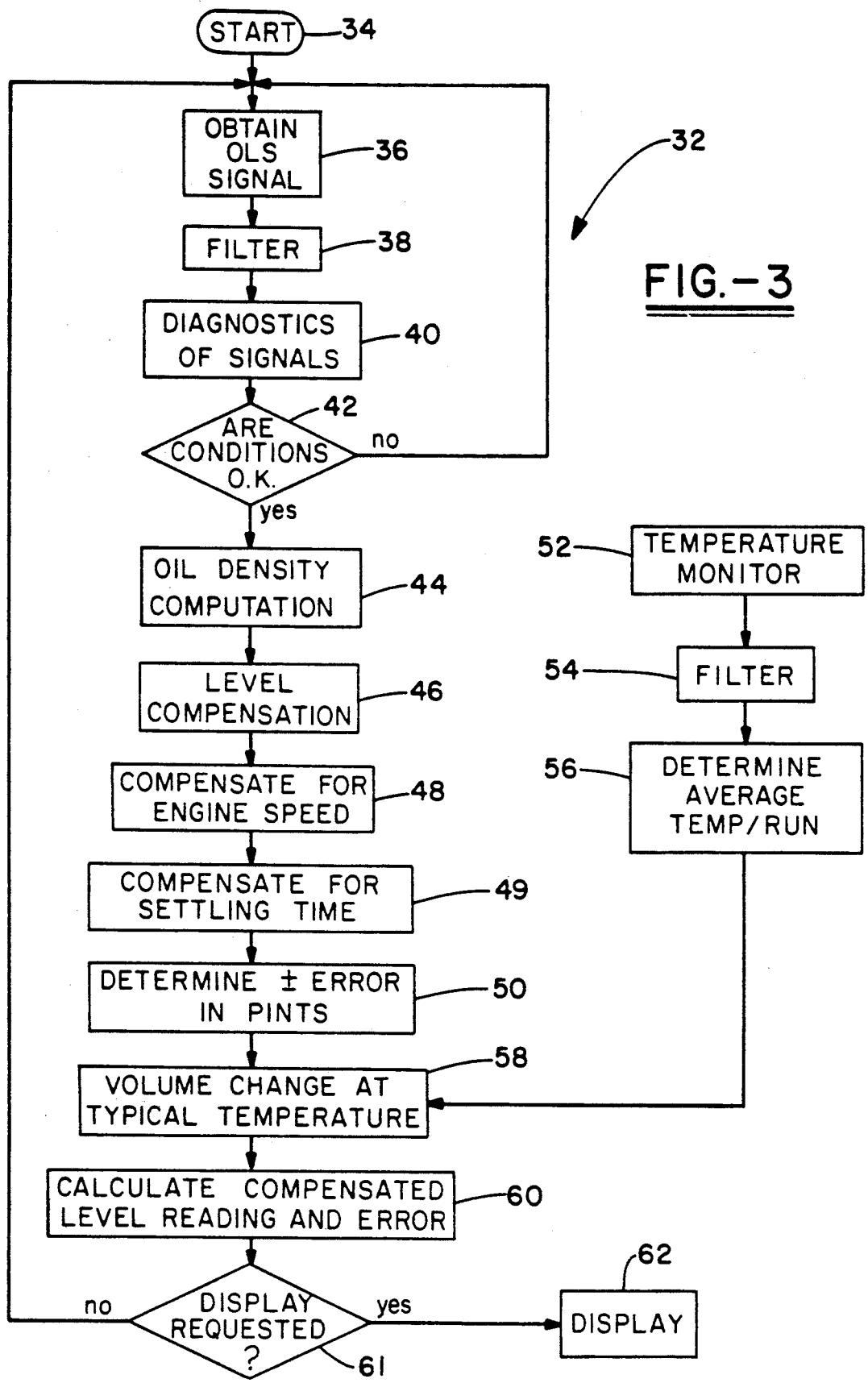
FIG. 3 is a flow chart of the method of the invention.

The data obtained from the sensors and transducers as illustrated in FIG. 2 is employed in the process of FIG. 3 to obtain reliable and accurate data corresponding to the deviation from ideal of the volume of transmission oil received and maintained within the automatic transmission 16. The process is designated generally by the numeral 32. Those skilled in the art will appreciate that the oil level system will typically be enabled only when the vehicle is stopped, the transmission is in neutral, and the engine is operating at an acceptable idle speed, such criteria all being sensed by the electronic control unit 20. If the oil level system is not enabled, the process 32 simply remains in a hold mode until enablement occurs.

When the oil level process is engaged as at 34, the output of the oil level sensor 26 is obtained as at 36 and passed to a filter 38 where the output signals are integrated over time to obtain an average signal which is accurately indicative of the actual level and density of oil within the reservoir of the transmission 16 receiving the float of the oil level sensor 26. The filter 38 effectively eliminates signal noise and spurious or extraneous signals to provide an accurate signal corresponding to actual fluid level.

At 40, a number of diagnostics of the data signals of FIG. 2 are undertaken to determine if an oil level determination may be made. Among the diagnostics is the determination as to whether the output of the oil level sensor 26 is a legitimate signal as existing between upper and lower threshold levels. An additional diagnostic is taken with respect to the oil temperature by monitoring the output of the temperature sensor 24 to determine if the oil temperature is within acceptable limits. Engine speed is also monitored to fall within a particular range to assure that the engine is at an acceptable idle speed for the test to be undertaken. As presented above, the engine speed is represented by the output signal from the transducer 28. In like manner, diagnostics are undertaken on the output of the transmission speed transducer 30 to assure that it also falls below a set threshold. Finally, the diagnostics at 40 also determines whether a predetermined time period has elapsed from the shifting of the transmission 16 into neutral to assure sufficient drain back or settling time for the transmission oil.

At decision block 42, a determination is made as to whether the data signals satisfy the diagnostic tests at 40 and whether a sufficient period of time has elapsed from the shifting of the transmission 16 into neutral. If the diagnostics are not satisfied, the process continues to loop as shown. If, however, the diagnostics are satisfied at 42, a first computation is made at 44 as to the density of the transmission oil. As mentioned above, and as known in the art, the density of transmission oil is a function of the temperature of the oil. Consequently, the electronic control unit 20 may simply employ a look-up table to determine the density of the oil corresponding to the temperature sensed by the thermistor 24. Since the output of the oil level sensor 26 correlates with the height of the float of the sensor, the same being a function of the actual level of the oil within the reservoir and the density of the oil, compensation must be made for any deviation of the oil density from a nominal value. The effective volume of the transmission oil within the reservoir is affected by resultant air entrainment within the oil resulting from operation of the transmission. At 46, such compensation is made, determining the effective level of the oil in the reservoir at a predetermined test density including air entrainment from transmission operation. Of course, such level is an indication of volume.

At 48, further compensation must be made for the output signal of the oil level sensor 26 as impacted by engine speed and settling time. As will be appreciated by those skilled in the art, transmission oil level is related to idle speed. Such relationship is formulated in a look-up table maintained in the memory of the electronic control unit 20. The signal obtained from the engine speed transducer 28 may then be employed to compensate or adjust the data of the output signal of the oil level sensor 26 to a nominal idle speed such as, for example, 600 rpm. Those skilled in the art will appreciate that the idle speed of the engine may vary as a function of many parameters, including the loading of the engine such as by activation of an air conditioner or other auxiliary loads.

At 49, further compensation is made for settling time. Once the transmission 16 is shifted into neutral, the transmission oil begins to drain into the transmission reservoir where the oil level sensor 26 is maintained. At the same time, air entrained in the oil during transmission operation begins to leave the oil. Accordingly, the actual amount of oil within the reservoir is time dependent as measured from the neutral shift. The rate at which the oil flows back to the reservoir is, of course, readily known and, accordingly, a look-up table may be provided in the electronic control unit 20 which correlates settling time with the volume of expected oil to be returned to the reservoir. Again, the settling time may be temperature dependent such that the look-up table comprises a family of curves. With the test of the process 32 targeted for a specific settling time, the deviation of settling time as it impacts the output of the oil level sensor 26 may be readily compensated from the look-up table.

Having compensated the output signal of the oil level sensor 26 for changes in temperature-related oil density, engine speed, and settling time, the corrected signal from the oil level sensor 26 is thus indicative of an actual oil level within the reservoir under ideal idling conditions. Any deviation of the adjusted level from a desired level is evidenced by an error at 50. Since the operations at 46, 48, and 49 are directed toward determining oil level in a lineal measurement such as millimeters, the error determined at 50 is calculated in such lineal dimensions and then converted to volume. The error is preferably determined in a readily recognizable unit of measure such as pints or the like. This error may be indicative of an absence of adequate transmission fluid within the reservoir, or the presence of excessive fluid.

As presented above, those skilled in the art readily appreciate that oil density is temperature dependent. Accordingly, the volume of the oil within the reservoir of the transmission 16 is also temperature dependent. Accordingly, it is necessary at 58 to compensate for any volume change between the actual temperature at which the oil level is measured and the typical operating temperature of the oil. As shown in FIG. 3, the temperature of the oil as sensed by the thermistor 24 is continually monitored as at 52 during the entire period of operation of the transmission 16. The temperature signals are passed through an appropriate filter 54 and are integrated or otherwise averaged as at 56 so that a characteristic operating oil temperature may be determined as at 56. Since it is likely that the temperature of the oil at the time of the test differs from the average operating temperature of the oil, it is necessary at 58 to compensate for the difference in temperature and, accordingly, for the resultant difference in the error as determined at 50. If the test temperature and typical operating temperature are the same, then the error determined at 50 will be accurate. However, if the test temperature is higher or lower than the average operating temperature, then adjustment is necessary to the error determination at 50 such that the amount of oil added to or released from the transmission 16 will be appropriate. The amount of correction is obtained from a look-up table at 58 which is calibrated to acknowledge the thermal expansion for the design volume of the reservoir of the transmission in question. A calculation is made at 60 as to the temperature-compensated level reading and resultant error. This information may be employed by the operator to take appropriate corrective action to add oil to or remove oil from the transmission reservoir.

A display of the compensated oil level and/or error determination may be requested by the operator as at 61 to allow the operator to take appropriate corrective action. Such a request may be made by an appropriate switch or the like. When such a request is made an appropriate display is made as at 62 on a read-out device such as an LED or liquid crystal device. If no display is requested, the process 32 simply loops to begin anew.

It will be appreciated that the compensation for temperature deviation made at 58 could be employed between the operations of 49 and 50. In other words, such temperature compensation could be made to adjust the level determination before the volume error calculation at 50, or it may be employed as described above and shown in the drawing. In either event, compensation for deviation from typical operating temperatures is made.

It should now be appreciated that the concept of the invention is operable to accurately measure transmission oil levels and to compensate the measured level for deviations from optimal test conditions. Such compensation may be made on the basis of the deviation of the oil temperature from a nominal test temperature, or similar deviations of engine speed and settling time. The output signal from the oil level sensor 26 is first compensated to adjust for changes in oil density resulting from deviations in the oil temperature from nominal desired test conditions, then the oil level and error is adjusted to compensate for the deviations just described. Consequently, each test or measurement is effectively made at ideal test conditions, for compensation is made for any deviation from such ideal conditions.

Thus it can be seen that the objects of the invention have been satisfied by the structure and method presented above. While in accordance with the patent statute only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A method for determining an oil level in a transmission driven by an engine, comprising:
   generating a first signal corresponding to an actual transmission oil level and density;
   generating a second signal corresponding to actual transmission oil temperature;
   determining said actual oil level as a function of said first and second signals;
   determining a deviation of actual engine speed from a reference idle engine speed and compensating said determination of actual oil level as a function thereof;
   calculating a deviation of said compensated actual oil level from a desired oil level and determining a volume error therefrom;
   determining a deviation of said actual oil temperature from a typical operating reference temperature of said transmission oil; and
   adjusting said volume error as a function of said deviation of said oil temperature.

2. A method for determining an oil level in a transmission driven by an engine, comprising:
   placing said transmission in neutral;
   determining an actual oil level within the transmission;
   determining a deviation of actual engine speed from a reference idle engine speed and compensating said determination of actual oil level as a function thereof;
   determining a period of time from when said transmission was placed in neutral and said determination of actual oil level was made and compensating said determination of actual oil level as a function thereof;
   calculating a deviation of said compensated oil level determination from a desired oil level and determining a volume error therefrom;
   determining a deviation of actual oil temperature from a typical operating reference temperature of the transmission oil; and
   adjusting said volume error as a function of said deviation of said oil temperature.

3. Apparatus for determining an oil level in a transmission driven by an engine, comprising:
   means within the transmission for generating a first signal corresponding to an actual transmission oil level and density;
   means within the transmission for generating a second signal corresponding to actual transmission oil temperature; and
   means connected to said transmission for receiving said first and second signals and determining said actual oil level as a function thereof, determining a deviation of actual engine speed from a reference idle engine speed, determining a period of time between when the transmission is placed in neutral and said determination of actual oil level is made, compensating said determination of actual oil level as a function of said deviation of engine speed and said period of time, calculating a deviation of said compensated oil level from a desired oil level and determining a volume error therefrom, determining a deviation of actual oil temperature from a typical operating reference temperature of the transmission oil, and adjusting said volume error as a function of said deviation of oil temperature.

* * * * *